(12) United States Patent
Gagne et al.

(10) Patent No.: US 11,966,372 B1
(45) Date of Patent: Apr. 23, 2024

(54) DATABASE RECORD COMBINATION

(71) Applicant: Bottomline Technologies (de) Inc., Portsmouth, NH (US)

(72) Inventors: Richard Gagne, Lebanon, ME (US); Michelle Cloutier, Windham, ME (US); Brian Amend, Rye, NH (US); Sean Glerum, Dover, NH (US)

(73) Assignee: Bottomline Technologies, Inc., Portsmouth, NH (US)

( * ) Notice: Subject to any disclaimer, the term of this patent is extended or adjusted under 35 U.S.C. 154(b) by 267 days.

(21) Appl. No.: 16/864,947

(22) Filed: May 1, 2020

(51) Int. Cl.
*G06F 16/215* (2019.01)
*G06F 16/953* (2019.01)
*G06F 18/22* (2023.01)

(52) U.S. Cl.
CPC .......... *G06F 16/215* (2019.01); *G06F 16/953* (2019.01); *G06F 18/22* (2023.01)

(58) Field of Classification Search
CPC .............................. G06F 16/215; G06F 16/953
USPC ........................................................ 707/692
See application file for complete search history.

(56) References Cited

U.S. PATENT DOCUMENTS

| | | | |
|---|---|---|---|
| 5,600,735 A | 2/1997 | Seybold | |
| 5,600,835 A | 2/1997 | Garland et al. | |
| 5,761,665 A * | 6/1998 | Gardner | G06Q 10/10 |
| | | | 707/999.005 |
| 5,845,369 A | 12/1998 | Dunchock | |
| 6,801,190 B1 | 10/2004 | Robinson et al. | |
| 6,845,369 B1 | 1/2005 | Rodenburg | |
| 7,324,970 B2 * | 1/2008 | Magruder | G06Q 20/105 |
| | | | 705/38 |
| 7,716,129 B1 | 5/2010 | Tan et al. | |
| 7,912,842 B1 * | 3/2011 | Bayliss | G06F 16/215 |
| | | | 707/749 |
| 8,401,867 B2 | 3/2013 | Lagadec et al. | |
| 8,526,743 B1 * | 9/2013 | Campbell | H04N 23/80 |
| | | | 382/218 |
| 8,881,005 B2 | 11/2014 | Al et al. | |
| 9,015,036 B2 | 4/2015 | Karov et al. | |
| D764,495 S | 8/2016 | Cartlidge | |
| 9,449,346 B1 | 9/2016 | Hockey et al. | |
| D776,131 S | 1/2017 | Cartlidge | |

(Continued)

FOREIGN PATENT DOCUMENTS

| | | |
|---|---|---|
| EP | 2653982 A1 | 10/2013 |
| EP | 2636149 A4 | 10/2016 |

(Continued)

OTHER PUBLICATIONS

Appaloosa Store, "Siring Similarity Algorithms Compared", Apr. 5, 2018, webpage downloaded on Oct. 20, 2020 rom https://medium.com/@appaloosastore/string-similarity-algorithms-compared-3f7b4d12f0ff.

(Continued)

*Primary Examiner* — Mark E Hershley
(74) *Attorney, Agent, or Firm* — Richard A. Baker, Jr.

(57) ABSTRACT

A novel technique for matching, merging, and combining a new database record with a master database record is described herein. The technique uses specific fields to compare in a unique exact match and fuzzy match combination to determine if a non-exact matching record pair is indeed a matched pair. Once the match is established, the records are merged or combined to utilize the best information from the two records.

20 Claims, 4 Drawing Sheets

(56) References Cited

U.S. PATENT DOCUMENTS

| | | | |
|---|---|---|---|
| 9,595,023 B1 | 3/2017 | Hockey et al. | |
| 9,798,984 B2 | 10/2017 | Paleja et al. | |
| D803,233 S | 11/2017 | Wilberding | |
| 10,235,356 B2 | 3/2019 | Amend et al. | |
| 10,319,029 B1 | 6/2019 | Hockey et al. | |
| 10,489,388 B1* | 11/2019 | Rogynskyy | G06F 16/29 |
| D872,737 S | 1/2020 | Ressel et al. | |
| 10,699,075 B2 | 6/2020 | Amend et al. | |
| 10,824,809 B2 | 11/2020 | Kutsch et al. | |
| 10,838,987 B1* | 11/2020 | Edwards | G06F 16/288 |
| 10,909,511 B2 | 2/2021 | Chanyontpatanakul | |
| 10,929,851 B2 | 2/2021 | Kang et al. | |
| 2006/0053107 A1* | 3/2006 | Stuart | G06F 16/2455 |
| 2006/0074986 A1* | 4/2006 | Mallalieu | G06F 21/32 |
| 2007/0162761 A1* | 7/2007 | Davis | G06F 18/00 |
| | | | 713/176 |
| 2008/0005106 A1* | 1/2008 | Schumacher | G06F 16/24556 |
| 2009/0174667 A1 | 7/2009 | Kocienda et al. | |
| 2010/0106724 A1* | 4/2010 | Anderson | G06F 16/285 |
| | | | 707/E17.046 |
| 2012/0059853 A1* | 3/2012 | Jagota | G06F 16/29 |
| | | | 707/E17.014 |
| 2012/0203708 A1* | 8/2012 | Psota | G06Q 30/06 |
| | | | 705/347 |
| 2013/0254115 A1 | 9/2013 | Pasa et al. | |
| 2013/0311362 A1* | 11/2013 | Milam | G06Q 30/04 |
| | | | 705/40 |
| 2015/0006491 A1* | 1/2015 | He | G06F 16/27 |
| | | | 707/694 |
| 2015/0032738 A1* | 1/2015 | Nachnani | G06F 16/38 |
| | | | 707/723 |
| 2015/0039473 A1 | 2/2015 | Hu et al. | |
| 2015/0073929 A1* | 3/2015 | Psota | G06Q 30/0605 |
| | | | 705/26.2 |
| 2015/0215383 A1* | 7/2015 | Sun | H04W 4/00 |
| | | | 709/203 |
| 2015/0220509 A1 | 8/2015 | Karov Zangvil et al. | |
| 2016/0041984 A1 | 2/2016 | Kaneda et al. | |
| 2017/0011126 A1* | 1/2017 | Lerman | G06F 16/9537 |
| 2017/0034023 A1* | 2/2017 | Nickolov | H04L 43/0817 |
| 2017/0039219 A1 | 2/2017 | Acharya et al. | |
| 2017/0068954 A1 | 3/2017 | Hockey et al. | |
| 2017/0070500 A1 | 3/2017 | Hockey et al. | |
| 2018/0225593 A1* | 8/2018 | Cozine | G06Q 30/0278 |
| 2019/0014101 A1 | 1/2019 | Hockey et al. | |
| 2019/0182233 A1 | 6/2019 | Hockey et al. | |
| 2019/0287116 A1* | 9/2019 | Karantzis | G06Q 20/4014 |
| 2019/0318122 A1 | 10/2019 | Hockey et al. | |
| 2021/0042767 A1* | 2/2021 | Guan | G06Q 30/0255 |
| 2021/0049326 A1 | 2/2021 | Amend et al. | |

FOREIGN PATENT DOCUMENTS

| | | |
|---|---|---|
| KR | 10-0723738 B1 | 5/2007 |
| WO | 2012/061701 A1 | 5/2012 |
| WO | 2017/209799 A1 | 12/2017 |

OTHER PUBLICATIONS

EMV Payment Tokenisation Specification, Technical Framework, EMVCo, LLC, Version 2.1, Jun. 2019.

International Search Report and Written Opinion received for PCT Patent Application No. PCT/US17/13148, mailed on May 19, 2017, 11 pages.

Vogler, Raffael, "Comparison of Siring Distance Algorithms", Aug. 21, 2013, webpage downloaded on Oct. 20, 2020 from https://www.joyofdala.de/blog/comparison-of-string-distance-algorithms.

Wikipedia, "Damerau-Levenshtein distance", webpage downloaded on Oct. 20, 2020 from https://en.wikipedia.org/wiki/Damerau-Levenshtein_distance.

"Oracle@ Warehouse Builder Data Modeling, ETL, and Data Quality Guide," Chapter 23, 11g Release 2 (11.2), Part No. E10935-04, Aug. 2011, web page downloaded from https://docs.oracle.com/cd/E24693_01/owb.11203/e10935/match_merge.htm on Apr. 16, 2020.

* cited by examiner

DATABASE RECORD COMBINATION

BACKGROUND

Prior Application

This application is a priority non-provisional patent application.

Technical Field

The system and methods described herein generally relate to databases, and, in particular, to the matching and combination of database records.

Description of the Related Art

Database technology has been used by the financial industry for more than half a century to keep track of customer information. Often, new records need to be added to the database, or new databases need to be added to a master database. Various techniques have been used to manage these merges of new information into the master database.

The difficulty in these database merges comes when the new record overlaps some of the information in the master database. Is this a new customer, or new information for the old customer? If the data is conflicting, how is the conflict resolved? Traditionally, the overlap is flagged by the database software and sent to a user to resolve. The software is incapable of resolving the conflict. However, this is very burdensome on the users of the software, as large database merges could create huge numbers of conflicts.

Recent database management systems, such as Oracle, contain rule sets for managing conflicts and merging records. See Chapter 23 of the Oracle® Warehouse Builder Data Modeling, ETL, and Data Quality Guide, 11g Release 2 (11.2), incorporated herein by reference.

But the Oracle solution does not automatically combine the records where there is conflicting information. An improved solution is needed in the industry to rapidly and automatically solve the long felt conflicting information problem, particularly using artificial intelligence and fuzzy logic to determine matches with minor mistakes, and select the proper information for the record. The present inventions provide a novel solution to this problem.

BRIEF SUMMARY OF THE INVENTION

An improved database record combination method is disclosed herein. The method is made up of the steps of (1) determining if a new record matches a master database record, and (2) combining, if the match is designated, the new record into the master database record. The determining step is made up of (1.a) designating a match if a master database record tax identification field exactly matches a new record tax identification field or if a master database record company name field exactly matches a new record company name field, and if both a master database record address field exactly matches a new record address field and if a master database record city field exactly matches a new record city field; (1.b) determining an interim confidence score by assigning a maximum of a tax identification confidence score, a company name confidence score, and a phone confidence score; and (1.c) designating the match if a threshold value is less than an average of the interim confidence score, an address confidence score, and a city confidence score. In some embodiments, the average also includes a state confidence score. The combining step is made up of, (2.a) setting a blank field in the master record with a new record field; and (2.b) verifying fields in the master record with a field verification service, and setting the master record fields with the new record fields if the master record is not verified.

The method could further comprise (1.d) designating the match if an address field of the master database record address is blank and if the master database record tax identification field exactly matches the new record tax identification field. The method could further comprise (1.e) normalizing the new record address field. In some embodiments, the method further comprises (1.e.1) normalizing the master record address field and (1.e.2) setting the address confidence score with a result from a Levenshtein distance comparison of the master record address field and the new record address field.

The method could also further comprise (1.f) setting of the company name confidence score is a result of a Levenshtein distance comparison of the master record company name field and the new record company name field. In some cases, the step of (1.f.1) normalizing of the new record company name field is included in the method. In some embodiments, the field verification service is an online address verification service. In some embodiments, the method further includes (1.g) searching the internet for one or more fields in the master database record.

An apparatus is also described herein. The apparatus is made up of a database server, a master database electrically connected to the database server, said database containing a plurality of master database records, and a new record electrically transmitted to the database server. The database server determines if the new record matches one of the plurality of master database records by designating a match if a master database record tax identification field exactly matches a new record tax identification field Or if a master database record company name field exactly matches a new record company name field and if both a master database record address field exactly matches a new record address field and if a master database record city field exactly matches a new record city field. The database server further determines an interim confidence score by assigning a maximum of a tax identification confidence score, a company name confidence score, and a phone confidence score, designating the match if a threshold value is less than an average of the interim confidence score, an address confidence score, and a city confidence score. In some embodiments, a state confidence score is also included in the average, Furthermore, the database server combines, if the match is designated, the new record into the master database record by setting a blank field in the master record with a new record field and verifying fields in the master record with a field verification service, and setting the master record fields with the new record fields if the master record is not verified.

The field verification service is an online address verification service in some embodiments. In some cases, the new record is entered on a computer. In other cases, the new record is from a new database. And in still another embodiment the new record is an existing record in the master database.

DETAILED DESCRIPTION

The present disclosure is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

The present inventions present an improved solution to the match, merge, combine function of a database management solution. In this function, a new record, or a new database is added to a master database. In addition, the master database can be evaluated to identify internal matches for merging and combining. The master database is searched for information from the new record to identify matches. When a match is found, the data from the new record is merged and combined with the data in the record in the master database. A novel method for the match, the merge and the combination is listed below.

Figure 1:
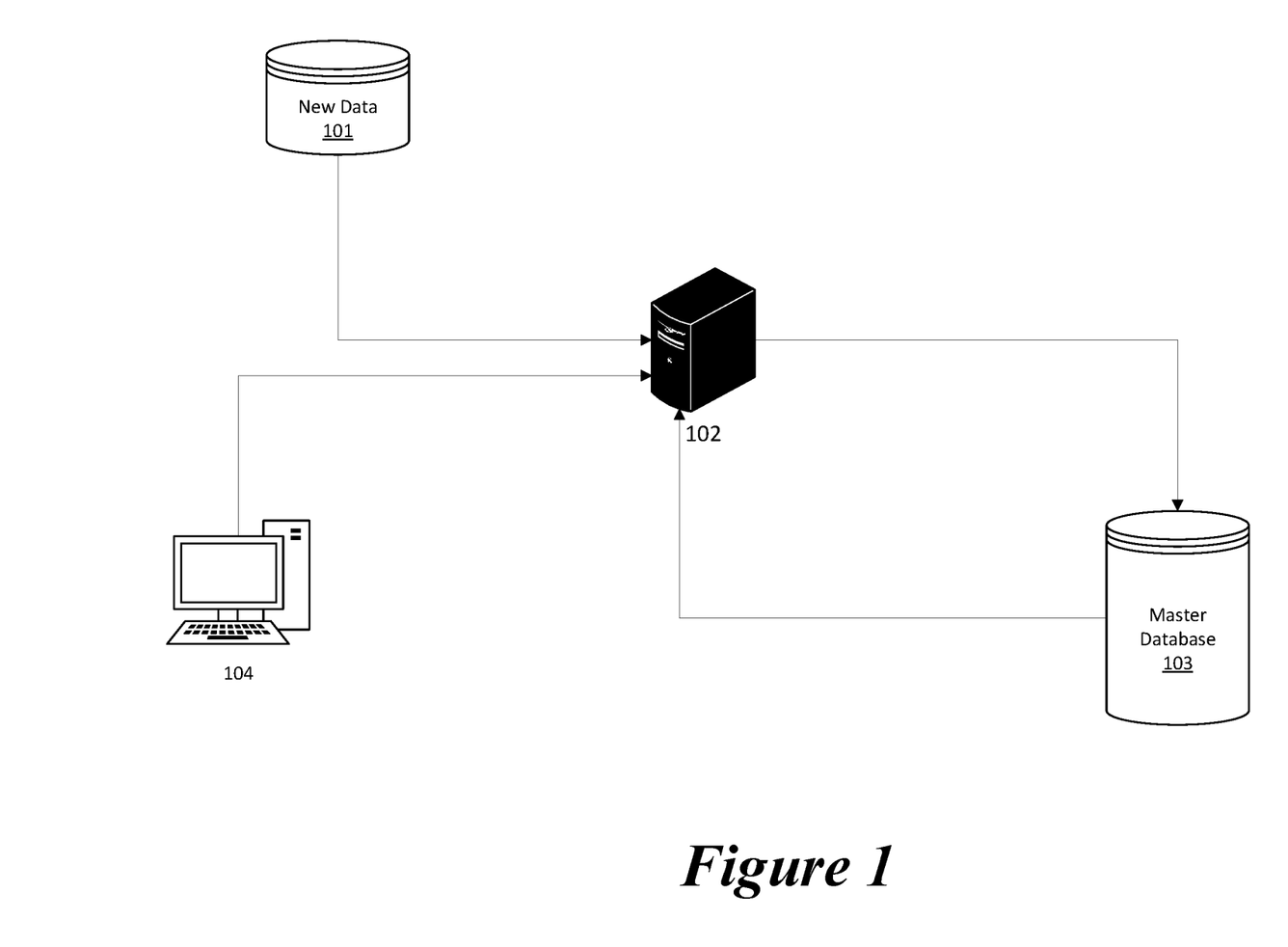
FIG. 1 is a diagram of a new database being merged into a master database using the match, merge, combine software.

Looking to FIG. 1, there are three ways that the master database 103 is updated through the match, merge, combine function 201 operating in the database server 102. In the first embodiment, a new database 101 with a plurality of new records is merged into the master database 103 through the database server 102. In a second embodiment, a new record is created on a computer 104 that is sent to the database server 102 for incorporation in the master database 103 using the match, merge, combine function 201. In the third embodiment, the records in the master database 103 are run through the database server's 102 match, merge, combine function 201 to eliminate duplicate records in the master database 103. In some embodiments, the database server 102 is electrically connected to the master database 103, and master database records are electrically transmitted between the database server 102 and the master database 103. In some embodiments, the database server 102 is electrically connected to the new database 101, and the new record is electrically transmitted to the database server. In some embodiments, the database server 102 is electrically connected to the computer 104 and receives records from the computer 104.

In some embodiments, the database server 102 is directly connected to the master database 103, the computer 104, and the new database 101. In other embodiments, one or more of these devices could be connected by a local area network, a wireless network, or the internet.

Figure 2:
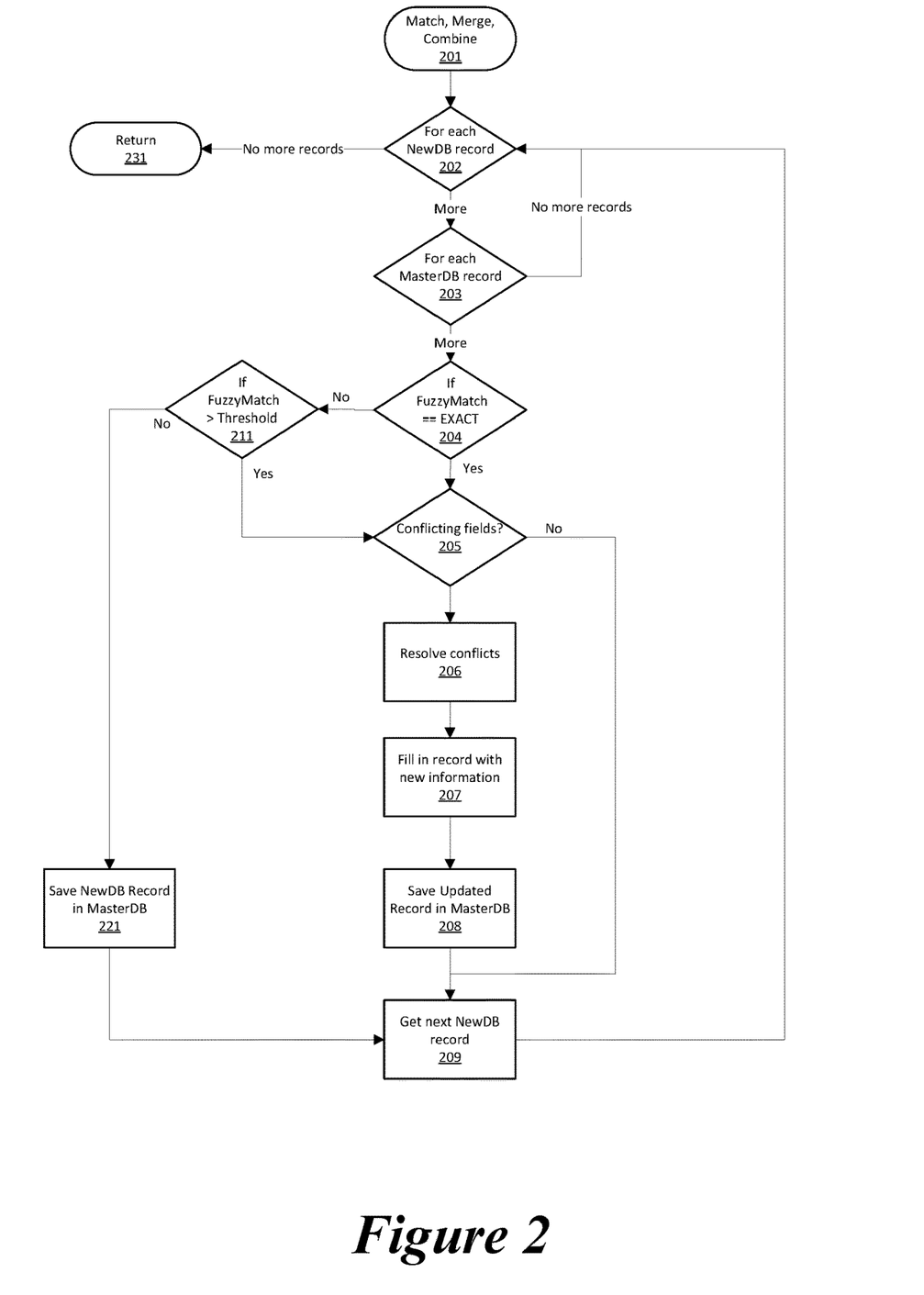
FIG. 2 is a flow chart of the match, merge, combine software.

The match, merge, combine function 201 is seen is a flow chart in FIG. 2, for the new database embodiment. The single record embodiment does not need the new database loop 202, 209, and would exit 231 at the "no more records" from the Master loop 203. In the eliminate duplicates in the master embodiment, the new database loop 202, 209 uses the master records instead of the new database records.

The match, merge, combine function 201 begins with a for loop 202 processing each record of the new database. If there are no more records in the new database, then the match, merge, combine function 201 finishes and exits 231. If there are additional records in the new database, then the next record is compared to each record in the master database. In one embodiment, the search through the master database is performed as a linear search so that fuzzy parameters and specific comparisons can be performed on various fields in the record.

In other embodiments, various combinations of hashing, binary, linear, and other search algorithms could be used to efficiently locate matching records. In some embodiments, the algorithm for search large datasets described in U.S. patent application Ser. No. 16/455,811, "Two Step Algorithm for Non-exact Matching of Large Datasets", filed by Mark Kane, Richard J. Diekema, and Kaiyu Pan (application herein incorporated by reference) could be modified to search using the criteria herein. But for simplicity in our discussions here, we use a linear search in the description.

For each new database record, the master database is searched, using a linear search in this example. Each record in the master database 203 is checked, and if there are no more records, the for loop 203 exits, and the next new database record is checked 202. The master database record and the new database record are then check to see if there is an exact match 204 or a partial match 211 using a Fuzzy-Match algorithm 301, seen in Table 1 below and in FIG. 3.

TABLE 1

Standard Matching Rules:

| Outcomes | | Source Record match to TargetRecord | Criteria |
| --- | --- | --- | --- |
| Exact Match | Or | Tax ID | Exact Match |
| | | Company name OR DBA name | Exact Match all Keywords in the exact order after normalization |
| | And | One Address line of any type | Exact Match all Keywords in the exact order after normalization |
| | And | City | Exact Match after normalization |
| | And | State | Exact Match after normalization (if State doesn't exist, it's left off search query) |
| Probably Match | Or | Tax ID | Exact Match |
| | | Company name or DBA name | Fuzy Match on Keywords in any order after normalization; Exact match if no address |
| | | Phone Number | Exact Match (Contact Phone nbr and Main Phone nbr if exists) |
| | And | One Address line of any type | Exact Match on number and Fuzzy Match Keywords in any order after normalization |
| | And | City | Fuzzy Match after normalization (Keywords are joined) |
| | And | State | Exact Match after normalization (if State doesn't exist, it's left off search query) |

In one embodiment, the FuzzyMatch returns a 1 if there is a match, a 0 if there is no match, and a confidence score between 0 and 1 if the algorithm is unsure. If FuzzyMatch finds an exact match 204, then the matching records are checked for conflicting fields 205. This happens because an exact match may still have fields that do not match, for instance, the state field could be missing in one of the master or new record. Or the address could be missing. If there are no conflicting fields 205, then the loop 202, 209 continues by getting the next record 209.

If FuzzyMatch does not find an exact match 204, then the confidence score that FuzzyMatch returns is compared to a threshold value 211. If the confidence score is less than the threshold value 211, then there is not a match. The new record is saved in the master database as a new record 221, and the loop 202, 209 continues with a new record 209. If the confidence score is greater than or equal to (the equal field could be with either comparison without detracting from the inventions herein) the confidence score, then the master database record and the new record are compared to see if there are conflicting fields 205.

Figure 4:
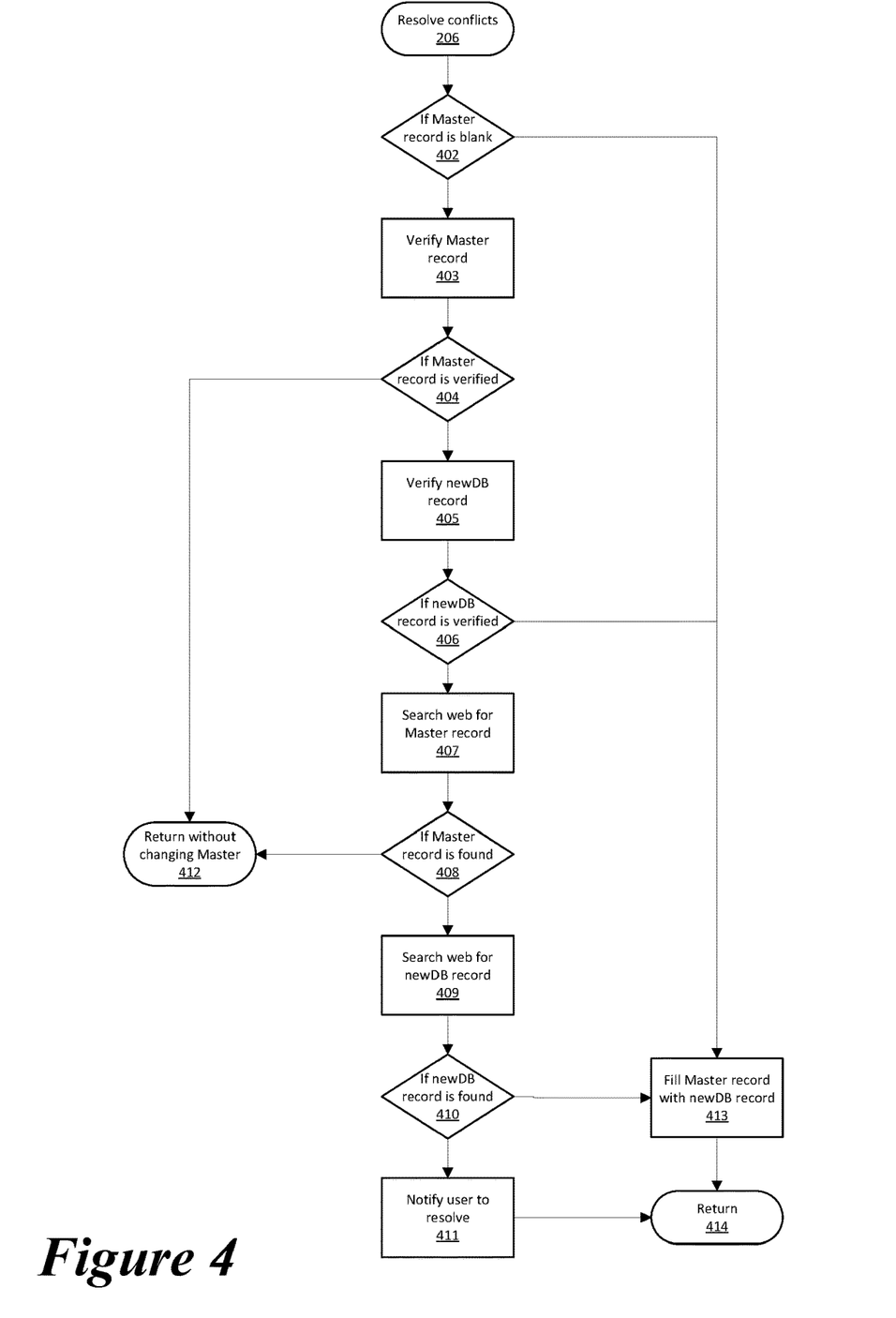
FIG. 4 is a flowchart of a combination of records from the master and new databases.

If there are conflicting fields 206, then the conflicts between the fields of the master database record and the new record are resolved 206. FIG. 4 shows the techniques for resolving the conflicts in additional detail. Once the conflicts have been resolved, the new information is placed in the master database record 207, and the updated record is saved in the master database 208. Next, the loop 202, 209 continues with a new record 209.

Each time we update a master database record, there is a chance that the updated record will match another existing record in the database. In some embodiments, once a master database record is modified, the entire database is then checked again to see if the updated record matches another record. This is a recursion on each change. As with all recursion, this algorithm could be rewritten with loops as well.

In the discussion below, normalization is the replacement of certain keywords with synonyms, and/or removal of keywords altogether (stop words), before matching. Note that in some embodiments, the normalization is done once when the data is loaded into the master database, so that the field does not need to be normalized each time a new database record is compared to the master database. Fuzzy matching means wrong, missing, transposed, or extra character (examples below). A term is a single word or number. If a Vendor Name is "Johns Towing Business", it consists of 3 terms, "johns", "towing", and "business".

In some embodiments, all numbers are parsed and must match exactly between the master and the new record. Levenshtein and other fuzzy matches are on text only in this particular embodiment.

Some embodiments use a prefix-length. The prefix-length is the number of initial characters in a term that will not be "fuzzified" (helps with performance). If the term is up to nine characters in length, the first term character will not be fuzzified; for each additional five characters, one more initial character of the source term will not be fuzzified. Probable matching uses 'fuzzy matching rules' for terms that are long enough and don't contain a number. If a term is under six characters, it may still be matched non-fuzzy. If a term contains a number, it will be matched non-fuzzy, no matter its length, in some embodiments. Fuzzy matching and term length: if the term is less than or equal to five characters, then the term is matched using a non-fuzzy algorithm. If the term is greater than five characters and less than or equal to ten characters, then allow one character to be fuzzy. If the term is greater than ten characters in length, then allow two characters to be fuzzy. Fuzzy matching example 1: 'rooster' fuzzy matches to 'roosder' (1 wrong), 'roster' (1 missing), 'roostre' (1 transposed), 'roosters' (1 extra). Fuzzy matching example 2: 'BottomlineTech' fuzzy matches to 'bottomlimeteck' (2 wrong), 'boomlinetech' (2 missing), 'bottmoilnetech' (2 transposed), 'bottomliineteach' (2 extra).

Normalization of Fields

Each master database field that is matched upon or indexed (saved to Elasticsearch) goes through a normalization process first to remove insignificant differences between otherwise identical words, such as uppercase versus lowercase. Fields are normalized with a tokenizer and one or more filters.

The Company field uses a standard tokenizer and uses the Standard, Lowercase, Stop, VendorNamesSynonymsFilter, VendorNamesStopWordsFilter filters. The Address field uses a standard tokenizer and uses the Standard, Lowercase, Stop, AddressLineStopWordsFilter, AddressLineBasicSynonymsFilter, join (the join filter joins all field terms with an underscore between each term) and AddressLineMainSynonymsFilter filters. The City field uses a standard tokenizer and the Standard, Lowercase, Stop, AddressCityStopWordsFilter, join filters. The State field uses a keyword tokenizer and the Lowercase, Trim, StateSynonymsFilter filters. The tax identification field uses a keyword tokenizer and a letter or digit filter (removes all characters except a letter or a digit). The Phone field uses a keyword tokenizer and a letter or digit filter.

Synonym and Stop-Words

In the matching world, a synonym refers to a term that will get replaced during normalization. For instance, incorporated, incorp=>inc is a VendorName synonym definition, so any occurrences of incorporated or incorp will be replaced with inc. Stop-Words get removed during normalization. inc is a VendorName Stop-Word, so inc will be removed (not stored as a term or used when comparing VendorNames in any way.

Figure 3:
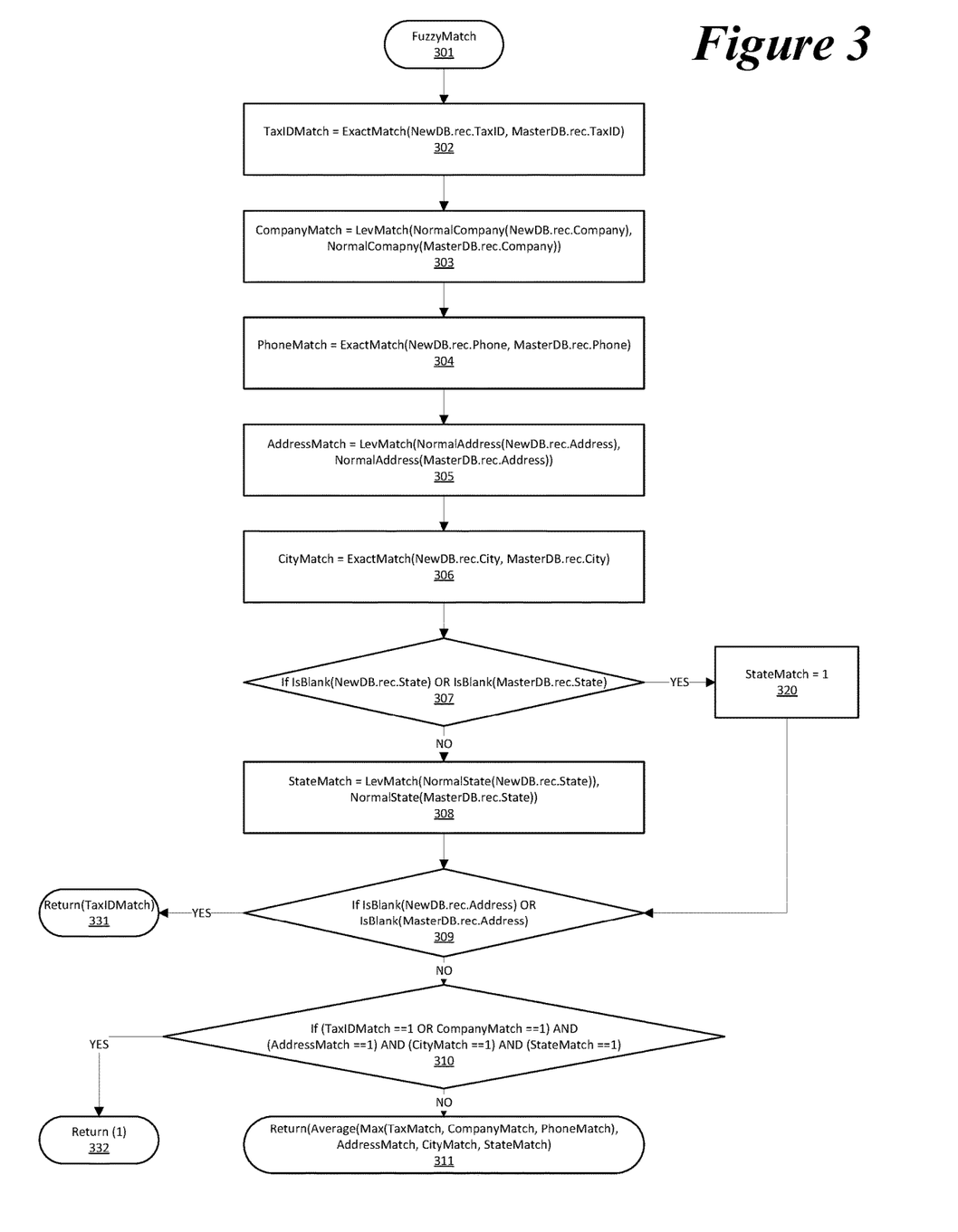
FIG. 3 is a flowchart of a fuzzy logic comparison of two records.

FIG. 3 shows a flow chart embodiment of Table 1. The FuzzyMatch 301 routine is called from the comparisons 204, 211 in FIG. 2, and returns either 1 for an exact match 332, the match of the tax identification fields 331 if the address is missing, or a confidence score 311. Essentially, this routine returns 1 for an exact match, 0 for no match, or a range between 0 and 1 representing a confidence score of the match between the records.

The FuzzyMatch 301 begins by analyzing and comparing the fields of the new database records and the master database records 302, 303, 304, 305, 306, 308. The order of these operations is not important. It then follows a decision tree 309, 310 to see which formula 311, 331, 332 is used to determine the confidence score to return.

The tax identification fields are compared between the new database record and the master database record for an exact match 302. If they match, the tax identification confidence score is a 1, and the tax identification confidence score is a 0 if they do not match, in one embodiment.

The company confidence score is determined by first normalizing the Company field of the new database record. This normalization changes common abbreviations to one form (convert all instances of Company to co, and Incorporated to inc. and eliminates punctuation. For instance, Bottomline Technologies (de), Incorporated is converted to bottomline technologies de inc. In some embodiments, all spaces are also removed. The normalization is also done to the Company field of the master database record. A Levenshtein distance could be used in some embodiments to then compare the normalized Company fields and set company confidence score with a confidence score relating to the extent of the match 303. Other algorithms could include Hamming distance (the number of positions with the same symbol in both strings), Damerau-Levenshtein distance (Levenshtein distance with transposition of adjacent symbols allowed), restricted Damerau-Levenshtein distance (Damereau-Levenshtein distance but each substring may be edited only once), longest common substring distance (minimum number of symbols to remove in both strings to make the substrings identical), q-gram distance (absolute differences between N-gram vectors of both strings), Jaccard distance (the division of the intersection count of two sets by the union count of the two sets), Jaro distance (complex formula), or Jaro-Winkler distance (the distance of finding similar character is 1 less than half of the length of the longest string).

The Phone fields are compared between the new database record and the master database record for an exact match 304. If they match, the phone confidence score is a 1 and the phone confidence score is a 0 if they do not match, in one embodiment.

The Address fields are compared between the new database record and the master database record. Both Address fields are normalized, converting all instances of road, street, lane, boulevard, avenue, etc into their abbreviations (or all abbreviations could be converted to their longer forms). Punctuation could be removed, and spaces could be removed. If there are separate address lines, each combination of lines could be compared in some embodiments. In other embodiments, the separate address lines could be combined and compared together. The address lines are compared using a Levenshtein distance algorithm (or similar algorithm), and the result is placed in the address confidence score 305. In some embodiments, the street number is split off of the road name, and the street numbers are compared for an exact match, where the street names are compared for a Levenshtein distance match.

The City fields are compared between the new database record and the master database record for an exact match 306. If they match, the city confidence score is a 1 and the city confidence score is a 0 if they do not match, in one embodiment.

If the State field in either the new database record or master database record is missing 307, then set the state confidence score to 1 (true) 320 and continue to 309.

If both State fields are present, normalize both State fields to their abbreviations (or their long-form in other embodiments) and set the state confidence score to the result of an exact comparison between the states 308.

If the Address field in either the new database record or the master database record is blank 309, there is not enough information to perform the complex comparisons, so simply return the result of the tax identification confidence score. 331. Note that there is enough information to make this determination after the tax identification confidence score is calculated in 302, and for performance reasons, comparison 309 could be moved below the tax identification confidence score calculation in 302. Much of the order of the operations in FuzzyMatch 301 could be changed without deviating from the inventions disclosed herein.

A comparison is then done to determine if there is an exact match of the records. This exact match is based on the current algorithm, and the difference between the records may be present. If either the tax identification confidence score or the company confidence score, and if the address confidence score and the city confidence score and the state confidence score 310, then FuzzyMatch returns 1 332 (True. In the exemplary embodiment, we are using 1 as True).

If there is not an exact match 310, then FuzzyMatch returns the confidence score 311. The confidence score is calculated by averaging the state confidence score, city confidence score, address confidence score, and the maximum of the tax identification confidence score, company confidence score, and phone confidence score. In some embodiments, the maximum of the tax identification confidence score, company confidence score, and phone confidence score are combined into an interim confidence score, which is used in the above-average calculation.

There are two sets of rules for different circumstances, standard matching and price matching. Pricing Matching rules only differ from the Standard matching rules in Probable matching when the source record has no address. In all other instances, the two rules are identical. Pricing matching rules can be chosen when a new Exercise is created, and if done so, will be used for the Segmentation and Deduping steps of that Exercise. They won't be used in the Matching step because the Matching step ignores records without addresses since they cannot be migrated.

TABLE 2

Standard v Pricing Matching Rules:

| Probable Standard Matching Rules (when Address not present in source) | |
|---|---|
| Tax ID | Exact Match |
| Probably Pricing Matching Rules (when Address not present in source) | |
| Or  Tax ID | Exact Match |
| Company name or DBA name | Exact Match |
| Phone Number | Exact Match |

As an example of the difference between the two rules, given the following three records within the operational tables:

TABLE 3

Example of Matching Rules:

| TARGET RECORD | |
|---|---|
| Vendor Name | Tri-Tech Forensics Inc |
| Tax Id | 111222333 |
| Phone Number | 603 501-1234 |
| TARGET RECORD | |
| Vendor Name | Aremac Holdings Corp |
| TaxID | 263669072 |
| Phone Number | (603) 501-5348 |
| TARGET RECORD | |
| Vendor Name | Aremac Holdings Co |
| Tax Id | 263669072 |
| Phone Number | 910.457.6600 |

Standard Matching Rules:

| SOURCE RECORD | |
|---|---|
| Vendor Name | Aremac Holdings Co |
| Tax Id | 263669072 |
| Phone Number | 910 457-6600 | matches to:

| TARGET RECORD | |
|---|---|
| Vendor Name | Aremac Holdings Co |
| Tax Id | 263669072 |
| Phone Number | (603) 501.5348 | on the tax identification field, but not the other two target records.

Example of Standard Matching Rules: Table 4

Pricing Matching Rules:

| SOURCE RECORD | |
|---|---|
| Vendor Name | Tri-Tech Forensics Inc. |
| Tax Id | 263669072 |
| Phone Number | 910-457-6600 | matches to:

| TARGET RECORD | |
|---|---|
| Vendor Name | Tri-Tech Forensics Inc |
| Tax Id | 111222333 |
| Phone Number | 603 501-5348 | on the VendorName field, and to

| TARGET RECORD | |
|---|---|
| Vendor Name | Aremac Holdings Co |
| Tax Id | 263669072 |
| Phone Number | (603) 501.5348 | on the tax identification field, and to

| TARGET RECORD | |
|---|---|
| Vendor Name | Aremac Holdings Co |
| Tax Id | 263669072 |
| Phone Number | (603) 501.5348 | or PhoneNumber.

Example of Price Matching Rules: Table 5

Examples where Addresses Exists

For Probable address line matching, one address line must match. The rule states Exact Match on number and Fuzzy Match Keywords in any order after normalization. The address can also match across multiple lines. For instance:

| Source Record | |
|---|---|
| Vendor Name | Smith & Nephew Orthopaedics |
| Tax Id | |
| Phone Number | |
| Address Line 1 | Wound Management, 75 Remittance Drive, Suite 6493 |
| Address Line 2 | |
| Address Line 3 | |
| Address Line 4 | |
| City | Chicago |
| State | IL | matches to

| TARGET RECORD 1 | |
|---|---|
| Vendor Name | Smith & Nephew Orthopaedics |
| Tax Id | 510123924 |
| Phone Number | 800-238-7538 |
| Address Line 1 | Wound Management |
| Address Line 2 | 75 Remittance Drive |
| Address Line 3 | Suite |
| Address Line 4 | 6493 |
| City | Chicago |
| State | IL | on VendorName and Address.

Example Where Addresses Exist: Table 6

They match in the opposite direction also. However, the Address matching is weaker because the source only needs to match one of its address lines (even though all match in this example).

| SOURCE RECORD 1 | |
|---|---|
| Vendor Name | Smith & Nephew Orthopaedics |
| Tax Id | 510123924 |
| Phone Number | 800-238-7538 |
| Address Line 1 | Wound Management |
| Address Line 2 | 75 Remittance Drive |
| Address Line 3 | Suite |
| Address Line 4 | 6493 |
| City | Chicago |
| State | IL | matches to

| TARGET RECORD 1 | |
|---|---|
| Vendor Name | Smith & Nephew Orthopaedics |
| Tax Id | |
| Phone Number | |
| Address Line 1 | Wound Management, 75 Remittance Drive, Suite 6493 |
| Address Line 2 | |
| Address Line 3 | |
| Address Line 4 | |
| City | Chicago |
| State | IL | on the VendorName and the Address fields.

Second Example Where Addresses Exist: Table 7

Per Standard Probable Matching Rules, State is Optional in address matching, so, if the Source does not contain a State, the State field does not get used when looking for a match, but if the Source does contain a State field, the State field does get used to query for a match.

| SOURCE RECORD 1 | |
|---|---|
| Vendor Name | Smith & Nephew Orthopaedics |
| Address Line 1 | Wound Management |
| City | Chicago |
| State | | matches to

| TARGET RECORD 1 | |
|---|---|
| Vendor Name | Smith & Nephew Orthopaedics |
| Address Line 1 | Wound Management |

-continued

| TARGET RECORD 1 | |
|---|---|
| City | Chicago |
| State | IL | on the VendorName and Address fields. But:

| SOURCE RECORD 1 | |
|---|---|
| Vendor Name | Smith & Nephew Orthopaedics |
| Address Line 1 | Wound Management |
| City | Chicago |
| State | IL | does NOT match to

| TARGET RECORD 1 | |
|---|---|
| Vendor Name | Smith & Nephew Orthopaedics |
| Address Line 1 | Wound Management |
| City | Chicago |
| State | | since the target does not match on the State field.

Third Example Where Addresses Exist: Table 8

Examples of Fuzzy Matching

As mentioned above, Probable matching is based on allowing a certain amount of Fuzziness in the matching. How much fuzziness depends on the length of the term in question.

Per Standard Probable Matching Rules, a term consisting of six to ten characters (with no numbers in it) is allowed to have a fuzziness of one wrong, missing, transposed, or extra character.

Example 1

| SOURCE RECORD 1 | |
|---|---|
| Vendor Name | Dun & Bradstreet |
| Address Line 1 | 475 Samsone St Ste 1700 |
| City | San Jose |
| State | CA | matches to

| TARGET RECORD 1 | |
|---|---|
| Vendor Name | Dun & Bradstrete |
| Address Line 1 | 475 Samsoone St Ste 1700 |
| City | San Hose |
| State | CA | or VendorName (Bradstreet=Bradstrete) and Address (Samsone=Somsoone and San Jose=San Hose). In this example Bradstrete has one transposition, Somesoone has one extra character, and San_Hose has one wrong character.

Example of Fuzzy Matching: Table 9

Of special note in this example is that the term Jose is under 5 characters so in that respect should have been matched exactly, not fuzzily, but City terms get joined to make a single term which acts to ensure matches are not out of order, so San Jose becomes San_Jose, which is long enough for fuzzy matching.

Example 2

| SOURCE RECORD 1 | |
|---|---|
| Vendor Name | Dun & Bradstreet |
| Address Line 1 | 475 Samsone St Ste 1700 |
| City | San Hose |
| State | CA | matches to

| TARGET RECORD 2 | |
|---|---|
| Vendor Name | Dun & Bradstreets |
| Address Line 1 | 475 Samson St Ste 1700 |
| City | San Jose |
| State | CA | on VendorName (Bradstreet=Bradstreets) and Address (Samsone=Samson). In this example Bradstreets has one extra character and Samson has one missing character.

Second Example of Fuzzy Matching: Table 10

Search Strategies

A Search Strategy, also known as a Matching Strategy, is a strategy of how to find matches between source and target records. The Relationship Optimization Center ("ROC") is the tool that uses these search techniques. The ROC uses two different Search Strategies, "Prob able Search Strategy" and "ExactAndProb able S earch Strategy". The Exact and Probable Network Matching is used for deduplicating. Probable matches are determined, and then from those, exact matches are auto-merged on the matches. The Exact and Probable Network Matching is also used for matching.

The Probable Network Matching is used for creating lists of probable matches for further review by humans to determine if the machine's findings warrant the merging of the records.

Merge—Combine

If possible, the records from the new database with the records of the master database. Auto-Approve and Auto-Map records occur when certain events take place, for instance for move/combines are done through a scheduled batch jobs.

Auto-MatchReview is logic that attempts to automate the Approval and Mapping of the master and new database records. There are a few core pre-conditions before either is attempted. If those pre-conditions are satisfied, Auto-Mapping is attempted.

The new database Company field will be auto-mapped to the master database record if that Company has only one address that satisfies the conditions: the Address is active and no more than one Address field matches.

After Auto-Mapping (regardless of the outcome), as long as the pre-conditions were satisfied, Auto-Approval is attempted. The Auto-Approval conditions are: 1. the new database record must contain a verified address. The Company field in the new database record is an exact match to the master database record's name field.

The verified address can be any type of address (Physical, Remittance, Mailing, NCOA, etc), and the ClientVendor only needs one of them to be verified in order to pass this condition. An address can become Verified several ways: User directly verifies an address or if the user verified address form above exactly matches any other address within the same Company (the actual Address or any other Company addresses within the record), those exact match addresses also become verified. During Migration, and Address is verified if any net new ClientVendor addresses EXACTLY match to existing Verified addresses, they become Verified as well. During a Move/Combine, an Address is verified if any source address is an EXACT match to a Verified destination address, the source address will become Verified as well. When a new database record is created, if it's address is an exact match to any Verified address, the new record's Address will become Verified as well An Exact address match means that one address Line is an exact match and the City is an exact match and the State, if it exists, is an exact match.

TABLE 11

Exact Address Matching:

| | | |
|---|---|---|
| And | One Address line of any type | Exact Match all Keywords in the exact order after normalization |
| And | City | Exact Match after normalization |
| And | State (if exists) | Exact Match after normalization |

FIG. 4 shows one embodiment of the combination of a record matched between the master database and the new database. In order to resolve conflicts 206 between the matched records, the flowchart starts by checking to see if the fields in the master database record that are blank 402, but that the new database has data in those fields. If not, the process continues to verify the master record 403. If so, the new database record is copied into the master record 413, and the routine exits 414. In some embodiments, if there is a partial data in the master, only those missing fields are updated and the process continues to verify the master record 403.

Next, the master record is verified using a verification service 403, such as an online verification service. For instance, addresses can be verified with the US Post Office database or one of any number of other companies that offer address verification (UPS, Experion, Smarty Streets, etc.). If the master database record address is verified 404, then the program exits without changing the master record 412.

However, if the master database record is not verified, then the new database record is verified 405. If the verification succeeds 406, then the new database record is copied into the master record 413, and the routine exits 414.

If neither the master database record nor the new database record can be verified, then an internet search is performed on the information in the master database record 407 to see if it is consistent with the company name. If the information is found and is consistent 408, then the program exits without changing the master record 412.

If the information in the master record cannot be checked on the internet 408, then a similar search is done with the information from the new database record 409. If the new database record is consistent with the internet search 410, then the new database record is copied into the master record 413, and the routine exits 414.

Otherwise, the records cannot be automatically resolved, and a user needs to be notified 411 to determine which information to place in the master database. The routine then exits 414.

It should be appreciated that many of the elements discussed in this specification may be implemented in a hardware circuit(s), a circuitry executing software code or instructions which are encoded within computer-readable media accessible to the circuitry, or a combination of a hardware circuit(s) and a circuitry or control block of an integrated circuit executing machine-readable code encoded within a computer-readable media. As such, the term circuit, module, server, application, or other equivalent description of an element as used throughout this specification is, unless otherwise indicated, intended to encompass a hardware circuit (whether discrete elements or an integrated circuit block), a circuitry or control block executing code encoded in a computer-readable media, or a combination of a hardware circuit(s) and a circuitry and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the inventions have been shown and described with respect to a certain embodiment or embodiments, equivalent alterations and modifications will occur to others skilled in the art upon the reading and understanding of this specification and the annexed drawings. In particular regard to the various functions performed by the above-described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the inventions. In addition, while a particular feature of the inventions may have been described above with respect to only one or more of several illustrated embodiments, such feature may be combined with one or more other features of the other embodiments, as may be desired and advantageous for any given or particular application.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. An improved database record combination method, the method comprising:
 determining, with hardware circuitry, if a new record matches a master database record, the determining comprising:
  designating a match if a master database record address field exactly matches a new record address field and if a master database record city field exactly matches a new record city field and if either a master database record tax identification field exactly matches a new record tax identification field or if a master database record company name field exactly matches a new record company name field;

determining an interim confidence score by assigning the interim confidence score a maximum value of either a tax identification confidence score, a company name confidence score, or a phone confidence score; and designating the match if a threshold value is less than an average of the interim confidence score, an address confidence score, and a city confidence score;

and combining, with the hardware circuitry, if the match is designated, the new record into the master database record, the combining comprising:

setting a blank field in the master database record with a new record field; and verifying fields in the master database record with a field verification service, and setting one or more master database record fields with one or more new record fields if the master database record is not verified.

2. The method of claim 1 further comprising designating the match if an address field of the master database record is blank and if the master database record tax identification field exactly matches the new record tax identification field.

3. The method of claim 1 further comprising normalizing the new record address field.

4. The method of claim 3 further comprising normalizing the master database record address field.

5. The method of claim 4 further comprising setting the address confidence score with a result from a Levenshtein distance comparison of the master database record address field and the new record address field.

6. The method of claim 1 further comprising the setting of the company name confidence score is a result from a Levenshtein distance comparison of the master record company name field and the new record company name field.

7. The method of claim 6 further comprising normalization of the new record company name field.

8. The method of claim 1 wherein the field verification service is an online address verification service.

9. The method of claim 1 wherein the designating the match if the threshold value is less than the average of the interim confidence score, the address confidence score, and the city confidence score further comprise a state confidence score.

10. The method of claim 1 further comprising searching an internet for one or more fields in the master database record.

11. An improved database combination method, the method comprising steps of:

determining, with hardware circuitry, if a new record matches a master database record, the determining comprising:

a means for designating a match if a master database record address field exactly matches a new record address field and if a master database record city field exactly matches a new record city field and if either a master database record tax identification field exactly matches a new record tax identification field or if a master database record company name field exactly matches a new record company name field;

a means for determining an interim confidence score by assigning to the interim confidence score a maximum value of either a tax identification confidence score, a company name confidence score, or a phone confidence score; and a means for designating the match if a threshold value is less than an average of the interim confidence score, an address confidence score, and a city confidence score;

and combining, with the hardware circuitry, if the match is designated, the new record into the master database record, the combining comprising the steps of:

setting a blank field in the master database record with a new record field; and a means for verifying fields in the master database record with a field verification service, and setting one or more master database record fields with one or more new record fields if the master database record is not verified.

12. The method of claim 11 further comprising designating the match if an address field of the master database record is blank and if the master database record tax identification field exactly matches the new record tax identification field.

13. The method of claim 11 further comprising setting the address confidence score with a result from a comparison of the master database record address field and the new record address field.

14. The method of claim 11 further comprising setting of the company name confidence score is a result from a comparison of the master database record company name field and the new record company name field.

15. An apparatus comprising:

a database server with hardware circuitry;

a master database electrically connected to the database server, said master database containing a plurality of master database records;

a new record electrically transmitted to the database server, wherein the database server determines, with the hardware circuitry, if the new record matches one of the plurality of master database records by designating a match if a master database record address field exactly matches a new record address field and if a master database record city field exactly matches a new record city field and if either a master database record tax identification field exactly matches a new record tax identification field or if a master database record company name field exactly matches a new record company name field, and further determines an interim confidence score by assigning the interim confidence score a maximum value of either a tax identification confidence score, a company name confidence score, or a phone confidence score, designating the match if a threshold value is less than an average of the interim confidence score, an address confidence score, and a city confidence score; and combines, with the hardware circuitry, if the match is designated, the new record into the master database record by setting a blank field in the master database record with a new record field and verifying fields in the master database record with a field verification service, and setting one or more master database record fields with one or more new record fields if the master database record is not verified.

16. The apparatus of claim 15 wherein the designation of the match if the threshold value is less than the average of the interim confidence score, the address confidence score, and the city confidence score further comprises a state confidence score.

17. The apparatus of claim 15 wherein the field verification service is an online address verification service.

18. The apparatus of claim 15 wherein the new record is entered on a computer.

19. The apparatus of claim 15 wherein the new record is from a new database.

20. The apparatus of claim 15 wherein the new record is an existing record in the master database.

* * * * *

UNITED STATES PATENT AND TRADEMARK OFFICE
CERTIFICATE OF CORRECTION

| | | |
|---|---|---|
| PATENT NO. | : 11,966,372 B1 | Page 1 of 1 |
| APPLICATION NO. | : 16/864947 | |
| DATED | : April 23, 2024 | |
| INVENTOR(S) | : Gagne et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 801 days.

Signed and Sealed this
Thirteenth Day of May, 2025

Coke Morgan Stewart
*Acting Director of the United States Patent and Trademark Office*